United States Patent [19]

Bracke

[11] 3,912,794
[45] Oct. 14, 1975

[54] PRODUCTION OF ABS RESINS
[75] Inventor: William J. I. Bracke, Hamme, Belgium
[73] Assignee: Labofina S.A., Brussels, Belgium
[22] Filed: Nov. 12, 1973
[21] Appl. No.: 415,240

[30] Foreign Application Priority Data
Nov. 21, 1972 France .............................. 72.41253

[52] U.S. Cl. ............................................ 260/880 R
[51] Int. Cl.² ........................................ C08L 47/00
[58] Field of Search .................... 260/880 R, 93.5 W

[56] References Cited
UNITED STATES PATENTS

| | | | |
|---|---|---|---|
| 3,047,534 | 7/1962 | Dyer et al. .......................... | 260/880 |
| 3,627,855 | 12/1971 | Shott et al. ......................... | 260/880 |
| 3,696,172 | 10/1972 | Kaiho et al. ........................ | 260/880 |
| 3,786,115 | 1/1974 | Osuga et al. ....................... | 260/880 |

Primary Examiner—Paul R. Michl

[57] ABSTRACT

A process for the production of ABS type resins consisting of styrenic compound acrylonitrile compound copolymer and polybutadiene rubber on which said styrenic compound and acrylonitrile compound are grafted, said process comprising carrying out a mass-copolymerization of a styrenic compound and an acrylonitrile compound in the presence of polybutadiene rubber, at a temperature of between 75° and 125°C, up to formation of a mass copolymer having a viscosity of between about 5,000 and 100,000 centipoises when measured at 65°C and in which the continuous phase is a styrenic compound acrylonitrile compound copolymer which contains styrenic and acrylonitrile compounds, adding to said mass copolymer an aqueous dispersion of a suspending agent and then a surfactive agent, and thereafter carrying out a suspension polymerization at a temperature of between 75° and 150°C.

13 Claims, No Drawings

PRODUCTION OF ABS RESINS

The present invention relates to synthetic resins. More particularly, the present invention relates to ABS resins and to a process for production thereof.

By polymerizing vinyl compounds, more particularly a mixture of styrene and acrylonitrile, in the presence of an elastomer, typically a polybutadiene rubber, compositions are obtained which consist of said rubber and acrylonitrile-styrene copolymer, a part of said copolymer being grafted onto the rubber particles. These compositions, which are called ABS resins, have good mechanical properties such as, for instance, a high impact resistance. Such resins have particularly good impact resistance when the copolymer is grafted on the rubber in an amount corresponding to at least 25% by weight based on the weight of rubber. The rest of the copolymer forms a continuous phase in which the particles of grafted rubber are dispersed.

ABS resins can be prepared according to any of the usual styrene monomer polymerization processes, such as mass, emulsion or suspension polymerization. However, problems are often encountered when these processes are applied to the preparation of ABS on a commercial scale. As a result, the copolymerization is most often carried out by a two-step process comprising a mass-copolymerization in the first step followed by a suspension copolymerization as the second step. The ABS resins prepared according to this method are obtained in the form of beads which are easily separated from the reaction mixture and then washed and dried. In practical application, however, suspending the mass-copolymer is a critical step. Further, it is not easy to obtain beads having a uniform and desired size. Additionally, the mechanical properties of the ABS resins sometimes vary widely.

It is an object of the present invention to provide a new and improved process for manufacturing ABS resins.

Another object of the present invention is to provide a new and improved process for preparing ABS resins wherein said resins have improved mechanical properties.

A further object of the present invention is to provide an improved process for the manufacture of ABS resins which permits utilization of presently employed equipment for preparation of these resins.

A still further object of the present invention is to provide a process for producing ABS resins by a two-step process whereby bead size uniformity is improved.

The above and related objects may be attained by the process of the present invention which comprises carrying out a mass-copolymerization step of a styrenic compound and an acrylonitrile compound in the absence of air or oxygen and in the presence of a rubber, at a temperature of between 75° and 125°C, until a mass copolymer is formed having a viscosity of between about 5,000 and 100,000 centipoises at 65°C and in which the continuous phase is a copolymer of said styrenic compound and said acrylonitrile compound containing styrenic compound and acrylonitrile compound monomer, and carrying out a suspension polymerization step by adding to product of the mass-copolymerization step an aqueous dispersion of a suspending agent, and a surfactive agent, and subjecting the resulting mixture to agitation at a temperature of between 75° and 150°C.

Generally, the reaction mixture which is subjected to the mass-copolymerization step is a mixture of monomers comprising 65 to 90% of styrenic compound, 35 to 10% of acrylonitrile compound, and an amount of rubber corresponding to about 7 to 15%, based on the weight of monomers. Substituted styrenes, such as alpha-methylstyrene, p-chlorostyrene and the like may be used instead of or in admixture with styrene monomer. Such materials are herein collectively referred to as "styrenic compounds." Methacrylonitrile may be used instead of or in admixture with acrylonitrile. The term "acrylonitrile compound," as used herein, refers to both of these compounds or a mixture thereof. The rubber employed, generally, is a polymer of 1,4-diene, typically polybutadiene, polyisoprene or a mixture of these elastomers. Other rubbery compositions and copolymers of butadiene and vinyl compounds, such as for instance butadiene-styrene copolymer, also may be used, insofar as these compositions are soluble in the mixture of styrene and acrylonitrile.

The mixture of monomers and rubber form a homogeneous phase which is partially copolymerized during the mass-copolymerization step. The mixture is continuously stirred during this step. This copolymerization can be performed in the presence of any free radical generating catalyst, preferably a peroxy or a perazo compound, such as di-tert-butyl peroxide, lauroyl peroxide, cumyl peroxide, cumyl hydroperoxide, alpha, alpha'-azodiisobutyronitrile or mixtures thereof. The amount of such catalyst may vary between 0.01 and 2%, preferably between 0.05 and 1% by weight based on the total weight of rubber and monomers. The mass-copolymerization step, however, may be carried out in the absence of any catalyst, the copolymerization being a true thermal polymerization without such catalyst. The polymerization generally is carried out at a temperature of from 75° to 125°C for 2 to 24 hours. In addition, to employing catalysts, it is often desirable to incorporate molecular weight regulators into the reaction mixture. Such compounds as halogenated compounds, terpenes or preferably mercaptans, more particularly dodecylmercaptan are useful as such molecular weight regulators. When employed, these compounds usually are used in an amount corresponding to about 0.001 to 1%, more particularly 0.05 to 0.5% by weight based on the total weight of monomers and rubber.

The presence of basic compounds in the initial reaction mixture tends to affect the mass-copolymerization. These basic compounds act as catalysts for the reaction between mercaptans and acrylonitrile $$R-SH + CH_2=CH-CN \rightarrow R-S-CH_2-CH_2-CN,$$

and this reaction results in an undue consumption of mercaptans which, as discussed above, are used frequently as molecular weight regulators. The polybutadiene rubbers generally are prepared by anionic polymerization and, consequently, usually contain residual basic compounds. In order to avoid the above discussed secondary reaction with the mercaptans, these residual basic compounds must be nuetralized by acids. The amount of acid required can be determined by one skilled in the art. To avoid the formation of an over acidic reaction mixture, which tends to adversely affect the polymerization, the acid added preferably is a weak acid, more particularly acetic acid which is readily available and inexpensive.

It is desirable to carry out the mass-copolymerization step in the absence of air or oxygen. When air or oxygen is present, the copolymerization starts only after an inhibition period which is relatively long, for instance 2 to 3 hours, at about 100°C. After reaction begins, the copolymerization is difficult to control. In accordance with the process of the present invention, the copolymerization is carried out under an inert atmosphere, more particularly under nitrogen. In this way, the copolymerization starts rapidly and continues regularly. After a variable reaction time, depending primarily on the amounts of the various reactants, a phase separation occurs. At this point, the phase consisting essentially in styrenic compound acrylonitrile compound copolymer containing corresponding monomers, separates from a phase consisting of rubber and monomers of the styrene and acrylonitrile compounds. As the polymerization progresses, the viscosity increases and a further separation of phases occurs. The phase consisting of the styrenic compound-acrylonitrile compound copolymer containing the corresponding monomers, becomes a continuous phase. At this point, the polymerization rate of the styrenic and acrylonitrile compounds is about 10 to 25% and the viscosity of the reaction mixture generally is between 5,000 and 100,000 centipoises, preferably between 10,000 and 50,000 centipoises, at 65°C. Such conditions are those desirable for continuing the polymerization by suspension polymerization.

To carry out the suspension polymerization step, the product resulting from the partial copolymerization in mass is admixed with water and an aqueous dispersion of suspending agent or protective colloid. The suspending agent preferably is a water insoluble, inorganic compound, for instance $Al_2O_3$, $ZnO$, a phosphate, magnesium silicate, or the like, which may be easily and completely removed from the ABS beads. Tricalcium phosphate preferably is used as the suspending agent.

To obtain ABS resins in beads having the desired uniformity, preferably between 0.1 and 1.0 mm and having a major part of beads with size varying from 0.2 to 0.4 mm, it is required to carry out the suspension polymerization in the presence of a suspending agent on which a surfactive agent, of the non-ionic type or ionic type, is absorbed. Comparative experiments, however, have shown that aqueous dispersions of suspending agents on which a surfactive agent is absorbed may, under certain conditions, give erratic results as regards uniformity of the ABS beads. It has now been found that the amount of surfactive agent which is absorbed by the suspending agent is a critical value, which depends on the concentration of said surfactive agent in the aqueous solution, on the absorption power of the suspending agent, on the type of surfactive agent used and also, on the content of surfactive agents already present in the rubber. Systematic tests are required to evaluate this amount in each particular case. By way of example, in employing tricalcium phosphate as the suspending agent, the concentration of surfactive agent in the aqueous phase of the reaction mixture preferably is within the following ranges for the following surfactants:

sodium dodecylbenzenesulfonate : 0.2 to 0.4 g/l.
sodium 2-ethylhexylsulphate : 1 to 2 g/l.
sodium salt of the monosulfate of the condensation product of nonylphenol and ethylene oxide (24 ethylene oxide groups) : 0.05 to 0.1 g/l.
sodium salt of the monosulfate of the condensation product of laurylalcohol and ethylene oxide (8 ethylene oxide groups) : 0.02 to 0.1 g/l.

When the amount of surfactant which is absorbed by the suspending agent is outside the above critical ranges, the ABS resin produced is in beads having a larger than desired diameter which is detrimental to the working of these resins. Further, in some cases, when the amount of surfactant is outside these ranges, it is not possible to obtain a suspension of the product resulting from the partial copolymerization en masse.

In carrying out the suspension step, it is preferred that the process be carried out by mixing the reaction mixture resulting from the first step or mass-copolymerization step with water and adding first, the aqueous dispersion of suspending agent and thereafter, the surfactive agent, for instance sodium dodecylbenzenesulfonate in a preferred embodiment. Therefore, the suspending agent is not in the presence of a high concentration of surfactive agent and consequently it does not absorb too large an amount of surfactive agent and, therefore, does not become too lipophilic.

The suspension polymerization step is carried out at a temperature of between 75 and 150°C, in the presence of a catalyst when the first step was a thermal copolymerization. The catalysts for the second step of the process are the same as the hereinabove cited catalysts useful for the polymerization in mass. According to a preferred embodiment of this invention, the suspension polymerization is carried out initially at a temperature of between 75 and 125°C and the temperature then increased about 15° to 25°C when the beads of ABS resin have acquired a specific weight higher than that of the aqueous phase, and the polymerization is carried out at such increased temperature for a period of about 2 to 4 hours.

The process of the present invention may be carried out in the type of equipment which is currently used for the suspension polymerization of styrenic compounds or for the production of ABS resins employing suspension polymerization. Both steps of the process can be successively performed in the same reactor. However, another embodiment comprises the use of two reactors, the one for the mass-copolymerization and the other for the suspension polymerization.

The present invention is illustrated by the following examples:

EXAMPLE 1

23.35 kg of styrene, 8.62 kg of acrylonitrile, 1.723 kg of rubber (DIENE 35 of Firestone Tire and Rubber Co.), 0.069 kg of glacial acetic acid and 0.475 kg of water were introduced into a reactor. The mixture was kept under a nitrogen atmosphere and stirred overnight at a speed of 70 r.p.m. at about 20°C. Before the start of the mass-copolymerization, 0.045 kg of tert. dodecylmercaptan and 0.50 kg of styrene were added to the mixture. The mass-copolymerization was then carried out as a thermal polymerization, under a nitrogen atmosphere, at a temperature of 98°C and with stirring at 190 r.p.m. After 6½ hours, the viscosity of the reaction mixture was 6,000 centipoises (measured at 65°C). This mixture comprised a continuous phase consisting of styrene-acrylonitrile copolymers which contained the corresponding monomers and in which particles of grafted rubber were dispersed.

In a separate container, a dispersion of suspending agent was prepared by mixing 15.4 kg of water, 0.4 kg of trisodium phosphate and 0.525 kg of calcium chloride, at a temperature of 65°C. To the reaction mixture obtained by the mass-copolymerization was admixed 30.8 kg of water and the above described dispersion of suspending agent. Then, 0.29 kg of an aqueous solution containing 2.5% by weight of the sodium salt of dodecylbenzenesulfonic acid and 0.0324 kg of cumene peroxide was added to the mixture. The suspension polymerization was initially carried out at a temperature of 116°C and then increased to 135°C and maintained at such temperature for 3 hours until the beads of ABS resin began to settle off.

The finished product consisting of small, spherical beads, was separated from the reaction mixture, washed thoroughly with water and then dried. The beads were uniform in the following approximate screen size distribution:

| | |
|---|---|
| On 24 mesh | 0.10% |
| On 32 mesh | 0.45% |
| On 42 mesh | 16.74% |
| 60 mesh | 34.01% |
| 80 mesh | 33.68% |
| 115 mesh | 8.88% |
| Through 115 mesh | 6.14% |

Test specimens were prepared from these beads and were used for the determination of certain properties. These properties were as follows:

| | |
|---|---|
| Softening or VICAT temperature (ASTM D 1525) | 102°C |
| Impact strength (Izod) (ASTM D 256) | 5.7 kg cm/cm |
| Tensile modulus (ASTM D 638) | $26.4 \times 10^5$ Kg/cm2 |
| Tensile strength (ASTM D 638) | 563.5 kg/cm2 |
| Ultimate tensile strength (ASTM D 638) | 434 kg/cm2 |
| Bending strength (ASTM D 790) | 974 kg/cm2 |
| Bending modulus (ASTM D 790) | $27.58 \times 10^3$ kg/cm2 |

By way of comparison, a similar experiment was carried out with the exception that the sodium dodecylbenzenesulfonate was added in a separate container, together with trisodium phosphate and calcium chloride. In this way, the suspending agent was too lipophilic and it was not possible to obtain suspension of the copolymer resulting from the first step or mass-copolymerization. Another comparative experiment was carried out under the process first described above, but without the use of sodium dodecylbenzenesulfonate. It was not possible to obtain a suspension.

EXAMPLES 2 TO 4

The procedure of Example 1 was repeated in 3 separate runs, but with the use of the following surfactive agents:

Run 1 — sodium 2-ethylhexylsulfate : 3.1 kg
Run 2 — sodium salt of monosulfate of ethoxylated monylphenol (with 24 ethylene oxide groups) : 1.86 kg
Run 3 — sodium salt of sulfate of ethoxylated lauroyl alcohol (with 8 ethylene oxide groups) : 0.93 kg.

In each run, a suspension of the mass-copolymer was easily obtained. The size distribution of the beads was substantially the same as in Example 1.

EXAMPLES 5 AND 6

The procedure of Example 1 was repeated in 2 additional runs with the use of 22.77 kg of styrene, 7.75 kg of acrylonitrile, varying amounts of polybutadiene rubber (STEREON 702 of Firestone Tire & Rubber Co.), 0.0069 kg of acetic acid and 0.475 kg of water and 0.0403 kg of tert.-dodecylmercaptan and 0.5 kg of styrene. The mass copolymerization and the suspension copolymerization were carried out as described in Example 1. 4.033 kg of rubber were used in Run 5 (Example 5) and 4.653 kg of rubber in Run C (Example 6). After the mass-copolymerization step (about 7 hours), the viscosity was respectively 15,000 and 20,000 centipoises. The bead size and properties of the resulting polymer were the following:

| Beads size distribution | Example 5 | Example 6 |
|---|---|---|
| on 24 mesh | 0.05% | 0.08% |
| on 32 mesh | 0.15% | 0.25% |
| on 42 mesh | 10.53% | 50.89% |
| on 60 mesh | 24.29% | 17.98% |
| on 80 mesh | 51.62% | 19.61% |
| on 115 mesh | 10.30% | 9.05% |
| through 115 mesh | 2.84% | 2.14% |
| Impact strength (Izod) (Kg cm/cm) | 31.2 | 42.2 |
| Softening or VICAT t° (° C) | 100 | 99.5 |
| Ultimate elongation (%) | 79 | 87.1 |
| Tensile strength (kg/cm2) | 368.5 | 358 |
| Ultimate tensile strength (kg/cm2) | 339 | 342 |
| Bending strength (kg/cm2) | 694 | 627 |
| Bending modulus (kg/cm2) | $25.55 \times 10^3$ | $23.24 \times 10^3$ |

What is claimed is:

1. A process for the production of ABS type resins comprising a styrenic compound-acrylonitrile compound copolymer and polybutadiene rubber on which said styrenic compound and acrylonitrile compound are graft copolymerized, said process comprising carrying out a mass-copolymerization of a styrenic compound and an acrylonitrile compound in the presence of polybutadiene rubber, at a temperature of between 75° and 125°C., up to formation of a mass copolymer having a viscosity of between about 5,000 and 100,000 centipoises when measured at 65°C. and in which the continuous phase is a styreneic compound-acrylonitrile compound copolymer which contains styrenic and acrylonitrile monomeric compounds and polybutadiene rubber, adding to said mass copolymer an aqueous dispersion of a suspending agent, said suspending agent being capable of absorbing a non-ionic or ionic surface active agent and subsequently adding to the combined mass copolymer and aqueous dispersion a non-ionic or ionic surface active agent in an amount sufficient to produce upon suspension polymerization polymer beads having an average size between about 0.2 and 0.4 mm, and thereafter carrying out a suspension polymerization at a temperature of between 75 and 150°C.

2. The process of claim 1 wherein the mass-copolymerization is carried out in the absence of a free oxygen containing gas.

3. The process of claim 1 wherein the mass-copolymerization is a thermal polymerization.

4. The process of claim 1 wherein said styrenic compound is styrene monomer.

5. The process of claim 1 wherein said acrylonitrile compound is acrylonitrile.

6. The process of claim 1 wherein the mass-copolymerization is carried out with a mixture of styrene and acrylonitrile containing 65 to 90% by weight of styrene and 35 to 10% by weight of acrylonitrile, and an amount of rubber of between 5 and 15% of the total weight of monomers, 10 to 25% of each of these monomers being polymerized during this mass polymerization.

7. The process of claim 4 wherein the mass-copolymerization is carried out until formation of a mass having a viscosity of between 10,000 and 50,000 centipoises, measured at 65°C.

8. The process of claim 1 wherein the suspension polymerization is carried out in the presence of tricalcium phosphate as suspending agent.

9. The process of claim 8 wherein sodium dodecylbenzenesulfonate is added to the reaction mixture which is subjected to the suspension polymerization in an amount corresponding to 0.2 to 0.4 g. per liter of water in the aqueous phase of said reaction mixture.

10. The process of claim 8 wherein sodium 2-ethylhexylsulfate is added to the reaction mixture which is subjected to the suspension polymerization in an amount corresponding to 1 to 2 g. per litre of water in the aqueous phase of said reaction mixture.

11. The process of claim 8 wherein a surface active agent selected from the group consisting of the sodium salt of sulfate of ethoxylated monylphenol and sodium salt of sulfate of ethoxylated fatty alcohol containing 12–18 carbon atoms is added to the reaction mixture which is subjected to the suspension polymerization in an amount corresponding to 0.02 to 0.1 g. per litre of water in the aqueous phase of said reaction mixture.

12. The process of claim 1, wherein said suspending agent is a water-insoluble inorganic salt selected from the group consisting of $Al_2O_3$, $ZnO$, a phosphate and magnesium silicate.

13. The process of claim 1, wherein said suspending agent is tricalcium phosphate and said surface active agent is selected from the group consisting of:
sodium dodecylbenzenesulfonate in an aqueous phase concentration of from about 0.2 to 0.4 g/l; sodium 2-ethylhexylsulphate in an aqueous phase concentration of from about 1 to 2 g/l; a sodium salt of the monosulfate of the condensation product of nonylphenol and ethylene oxide in an aqueous phase concentration of from about 0.05 to 0.1 g/l; and a sodium salt of the monosulfate of the condensation product of laurylalcohol and ethylene oxide in an aqueous phase concentration of from about 0.02 to 0.1 g/l.

* * * * *